United States Patent
Fushimi et al.

(10) Patent No.: US 8,000,194 B2
(45) Date of Patent: Aug. 16, 2011

(54) OPTICAL DISC APPARATUS, METHOD OF ADJUSTING FOCUS OFFSET FOR OPTICAL DISC APPARATUS, AND PROGRAM FOR EXECUTING FOCUS OFFSET ADJUSTMENT

(75) Inventors: Tetsuya Fushimi, Tokyo (JP); Masaaki Kurebayashi, Ebina (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 0 days.

(21) Appl. No.: 12/690,789

(22) Filed: Jan. 20, 2010

(65) Prior Publication Data

US 2010/0118677 A1 May 13, 2010

Related U.S. Application Data

(63) Continuation of application No. 11/365,029, filed on Feb. 28, 2006, now Pat. No. 7,668,060.

(30) Foreign Application Priority Data

Apr. 25, 2005 (JP) .................................. 2005-126478

(51) Int. Cl.
*G11B 7/00* (2006.01)
(52) U.S. Cl. .................. 369/47.53; 369/53.28
(58) Field of Classification Search ............... 369/53.24, 369/53.26, 53.28, 47.53
See application file for complete search history.

(56) References Cited

U.S. PATENT DOCUMENTS

| 6,392,971 B1 | 5/2002 | Takiguchi et al. |
| 6,407,968 B1 | 6/2002 | Nakata et al. |
| 7,344,077 B2 | 3/2008 | Sagara et al. |
| 7,577,065 B2 * | 8/2009 | Kuroda et al. ............... 369/47.3 |
| 2004/0076084 A1 | 4/2004 | Yonezawa |
| 2006/0072416 A1 * | 4/2006 | Chen et al. .................. 369/53.28 |

FOREIGN PATENT DOCUMENTS

| JP | 08-235643 A | 9/1996 |
| JP | 09-007193 A | 1/1997 |
| JP | 11-003550 A | 1/1999 |
| JP | 11-025467 A | 1/1999 |
| JP | 2000-276743 A | 10/2000 |
| JP | 2001-093162 A | 4/2001 |
| JP | 2002-92880 A | 3/2002 |
| JP | 2002-298356 A | 10/2002 |
| JP | 2002-304730 A | 10/2002 |

(Continued)

OTHER PUBLICATIONS

Japan Patent Office office action for patent application JP2005-126478 (Jul. 13, 2010).

*Primary Examiner* — Adam R Giesy
(74) *Attorney, Agent, or Firm* — Kilpatrick Townsend & Stockton LLP

(57) ABSTRACT

In an optical disc apparatus, whether an unrecorded recording layer without information recorded thereon is included in the multiple recording layers of the optical disc mounted inside the apparatus is judged. then when the unrecorded recording layer is judged to be present, a signal for focus offset adjustment is recorded in a non-user data recording area of the unrecorded recording layer, and reproduction of the recorded focus offset adjusting signal is followed by its quality evaluation, which is further followed by calculation and setup of an appropriate focus offset value based on evaluation results.

8 Claims, 4 Drawing Sheets

FOREIGN PATENT DOCUMENTS

| | | |
|---|---|---|
| JP | 2002-373430 A | 12/2002 |
| JP | 2003-217140 A | 7/2003 |
| JP | 2003-338057 A | 11/2003 |
| JP | 2004-326987 A | 11/2004 |
| JP | 2005-259257 A | 9/2005 |
| JP | 2005-259259 A | 9/2005 |
| WO | WO 2004086382 A1 * | 10/2004 |
| WO | WO2004/086382 | 12/2005 |

* cited by examiner

OPTICAL DISC APPARATUS, METHOD OF ADJUSTING FOCUS OFFSET FOR OPTICAL DISC APPARATUS, AND PROGRAM FOR EXECUTING FOCUS OFFSET ADJUSTMENT

CROSS-REFERENCE TO RELATED APPLICATION(S)

This is a continuation of U.S. patent application Ser. No. 11/365,029, filed Feb. 28, 2006, which application claims priority from Japan Patent Application No. 2005-126478, filed on Apr. 25, 2005, the entire disclosure of which is incorporated herein by reference.

BACKGROUND OF THE INVENTION

1. Technical Field of the Invention

The present invention relates to a technique for adjusting focus offsets in an optical disc apparatus which records information on or reproduces information from an optical disc having a plurality of recording layers.

2. Description of the Related Art

Conventional techniques related to the present invention and intended to set and adjust focus offsets for the plural recording layers of an optical disc are described in, for example, Japanese Patent Specification (JP Spec.) No. 3465413 and Japanese Patent Laid-Open (Kokai) No. 2003-217140. The technique disclosed in JP Spec. No. 3465413 is as described below. First, a change of a recording layer is followed by the calculation of the difference between either the maximum tracking error signal amplitude values, maximum RF signal amplitude values, or minimum reproduction signal jitter levels measured before and after the change. If the difference is smaller than a required value, the value obtained before the change was used as the optimum value, or if the difference is larger than the required value, means for generating offsets is controlled and the optimum point is detected. The technique disclosed in Japanese Patent Laid-Open No. 2003-217140 is as described below. Offsets are controlled to obtain the maximum RF signal developed at the pre-pits that have been recorded in the grooves and lands of various recording layers, and independent focus offsets are set for each recording layer.

However, since the above conventional techniques both assume that information is already recorded in each recording layer (recording layer), it is considered to be difficult to set focus offsets for recording layers not having any information recorded thereon.

In order to solve this problem, according to the present invention allowing for the status of the above conventional techniques, appropriate focus offsets in an optical disc apparatus can be set, even for an unrecorded recording layer (a recording layer without recorded information).

An object of the present invention is to provide a technique that allows resolution of the problem involved and improvement of an optical disc apparatus in operational convenience.

SUMMARY OF THE INVENTION

The present invention provides an optical disc apparatus, and technique for adjusting focus offsets, that solved the problem involved.

That is, an optical disc apparatus according to the invention is of the construction outlined below. First, it is judged whether a plurality of recording layers on an optical disc mounted inside the apparatus include an unrecorded recording layer not having any information recorded thereon. Next, if a recording layer without recorded information is judged to be present, a signal for focus offset adjustment is written into a non-user data recording area on that unoccupied recording layer. After that, appropriate focus offset data is calculated and set from the recorded signal for focus offset adjustment, and then the set focus offset data is used to record information. The focus offset data is set as follows: the recorded signal for focus offset adjustment, for example, is read out and evaluated in signal quality, and then the appropriate focus offset data is set in accordance with evaluation results.

Also, the signal for adjusting a focus offset is written into a test recording area, a test recording count area, or an area other than those provided for by certain specifications or standards (hereinafter, this area is referred to as an out-of-spec area). In addition, for example, if the signal for focus offset adjustment is written into the test recording count area, simulated test recording, for example, is repeated a plurality of times.

More specifically, the present invention provides an optical disc apparatus that takes the above as basic requirements, a method of adjusting focus offsets in the apparatus, and a program for executing the focus offset adjustment.

According to the present invention, adjustment (inclusive of setup) of appropriate focus offsets in an optical disc apparatus is possible, even for unoccupied recording layers included in a plurality of recording layers, with the result that the optical disc apparatus can be improved in operational convenience.

DETAILED DESCRIPTION OF THE PREFERRED EMBODIMENTS

An embodiment of the present invention will be described hereunder using the accompanying drawings.

Figure 1:
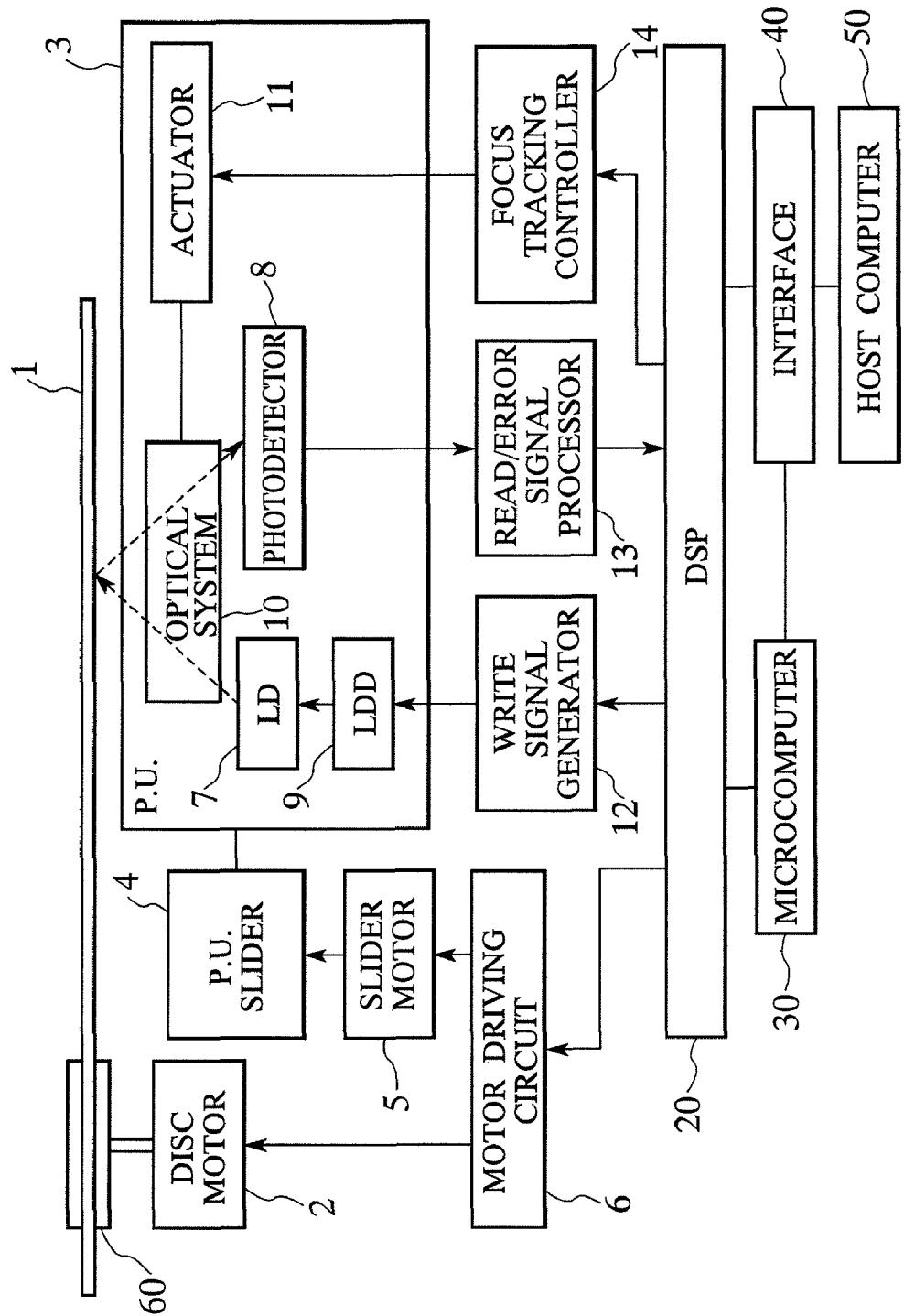
FIG. 1 is a block diagram showing an example of an optical disc apparatus as an embodiment of the present invention.
Figure 2:
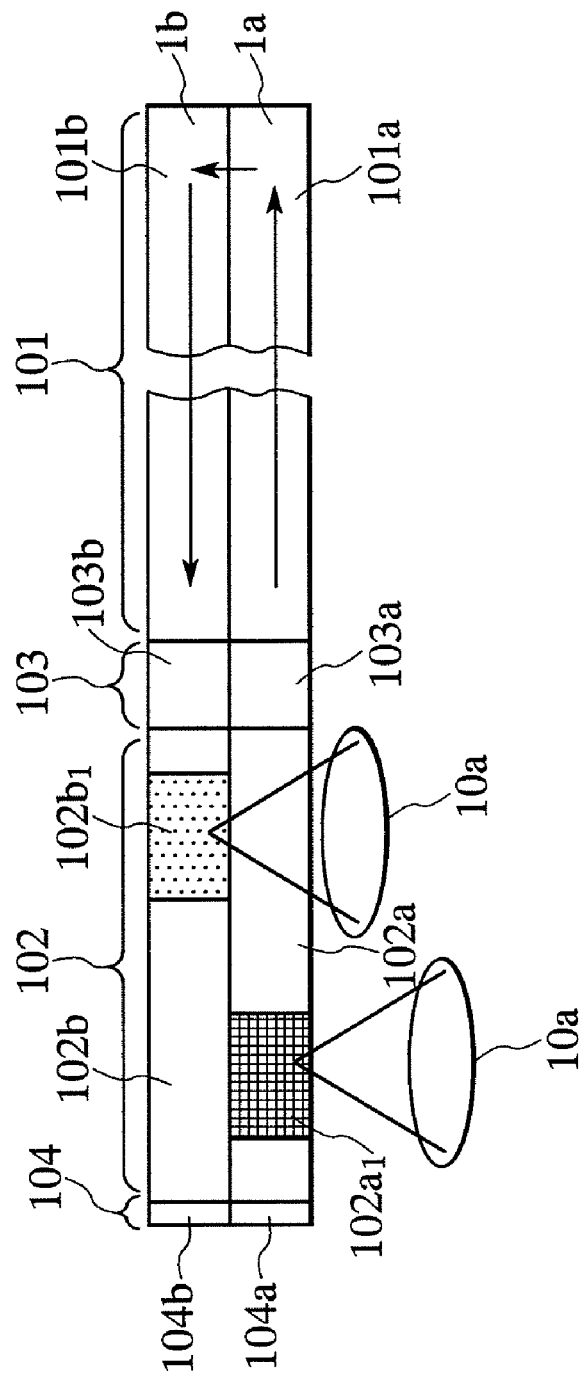
FIG. 2 is a diagram that explains an internal construction of an optical disc.
Figure 3:
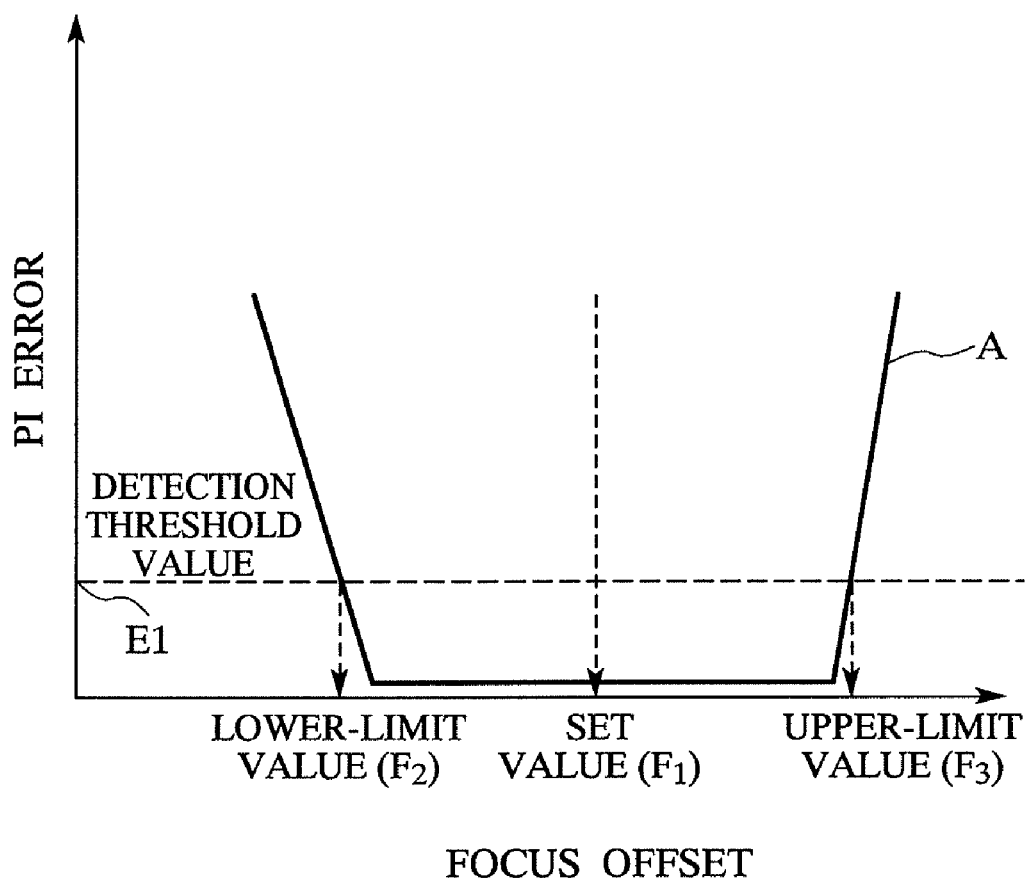
FIG. 3 is a diagram showing the relationship between focus offsets and PI errors in the optical disc apparatus of FIG. 1.
Figure 4:
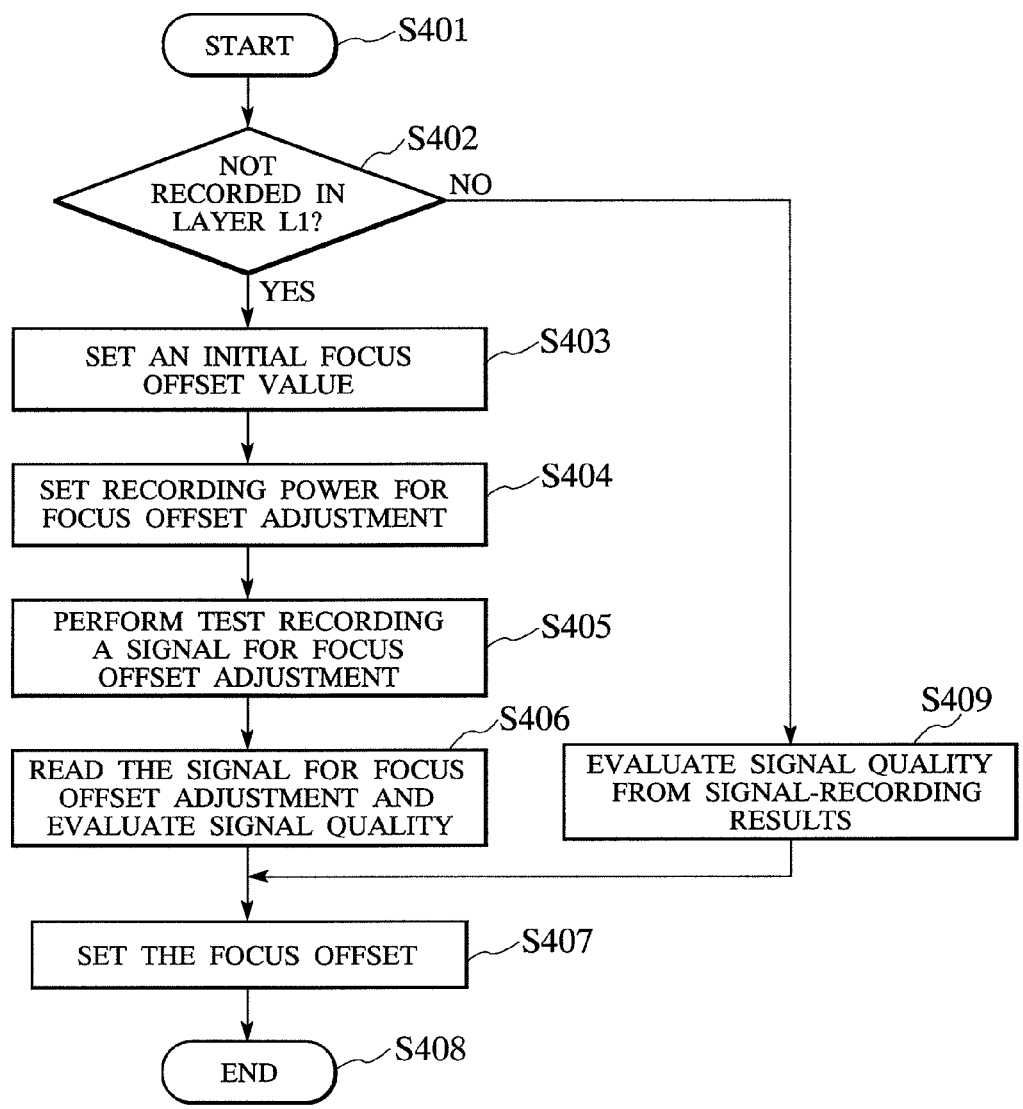
FIG. 4 is an explanatory diagram of an operating procedure for adjusting focus offsets in the optical disc apparatus of FIG. 1.

FIGS. 1 to 4 are diagrams that explain the embodiment of the present invention. FIG. 1 is a block diagram showing an example of an optical disc apparatus as the embodiment of the present invention, and FIG. 2 is a diagram that explains an internal construction of an optical disc mounted in the optical disc apparatus of FIG. 1. FIG. 3 is a diagram showing the relationship between focus offsets and PI errors in the optical disc apparatus of FIG. 1, and FIG. 4 is an explanatory diagram of an operating procedure for adjusting focus offsets in the optical disc apparatus of FIG. 1.

In FIG. 1, reference number 1 denotes an optical disc, such as a DVD+R, DVD-R, or BD (Blu-ray Disc), that has a plurality of recording layers (first and second recording layers). Reference number 2 denotes a disc motor that rotationally drives the optical disc 1, 3 an optical pickup, 4 a pickup slider that moves the optical disc 1 in a radial direction thereof, and 5 a slider motor for rotating a lead screw (not shown) inside the pickup slider 4. Reference number 6 denotes a motor driving circuit that controls and drives the disc motor 2 and the slider motor 5, 7 a laser diode that generates reading/writing laser light in the optical pickup 3, and 8 a photo detector that receives the laser light reflected from a recording surface of the optical disc 1. Reference number 9 denotes a laser drive circuit that drives the laser diode 7, 10 an optical system inclusive of an object lens (not shown) for optically processing the laser light that enters/exits to/from the recording surface of the optical disc 1, and 11 an actuator that changes a position and attitude of the optical system 10. Reference number 12 denotes a write signal generator that generates a write signal for recording on the optical disc 1, and 13 a read/error signal processor that processes the incoming read signal (reproduction signal) from the photo detector 8 as an RF signal, a tracking error signal, or a focus error signal, and 14 a focus/tracking controller that generates a signal for driving the actuator 11. Reference number 20 denotes a digital signal processor (DSP) that generates a servo signal to be supplied to the motor driving circuit 6, generates a signal for controlling the write signal generator, demodulating the read signal (RF signal) in accordance with a signal from the read/error signal processor 13, generates, from the tracking error signal or the focus error signal, a focus control signal and/or tracking control signal to be supplied to the focus/tracking controller 14, and/or controls a level of the servo signal. Reference number 30 denotes a microcomputer that controls the DSP 20, 40 an interface for acquiring a request signal for writing, and 50 a host computer that outputs the write request signal to the optical disc apparatus and requests the apparatus to write data signals. In the present embodiment, the DSP 20 and the microcomputer 30 constitute a controller of the optical disc apparatus. The DSP 20 or the microcomputer 30 executes the operating procedure for adjusting focus offsets in the present invention.

DETAILED DESCRIPTION OF THE INVENTION

In the above construction, when the DSP 20 outputs the disc motor driving servo signal to the motor driving circuit 6 under an instruction from the microcomputer 30, the motor driving circuit 6 that has received the servo signal forms a disc motor driving signal and outputs the driving signal to the disc motor 2 to rotate this motor at a required speed. The disc motor 2 rotates the optical disc 1 at a required speed via a turntable 60. During recording, when the write request signal from the host computer 50 is acquired through the interface 40, the microcomputer 30 sends an instruction signal recording to the DSP 20. In accordance with a control signal from the DSP 20 under an instruction from the microcomputer 30, the write signal generator 12 generates a write signal and inputs the signal to the laser drive circuit 9. The laser drive circuit 9 then uses the write signal to drive the laser diode 7 and thus causes the diode to generate laser light associated with the write signal. The laser light is passed through the optical system 10, irradiated onto the recording surface of the optical disc 1 which is rotating, and information is thus recorded in a required recording layer. During reproduction, the laser light reflected from a recording surface (recording layer) of the optical disc 1 is passed through the optical system 10 and enters the photo detector 8, in which the laser light is then converted into electrical signal form as a reproducing signal (read signal). The read signal is input to the read/error signal processor 13, in which the signal is then subjected to amplification (or other processes) for use as the RF signal, the tracking error signal, or the focus error signal.

The signal that has been output from the read/error signal processor 13 is input to the DSP 20, in which the RF signal is then demodulated and a tracking control signal or a focus control signal is formed from the tracking error signal or the focus error signal, respectively. The tracking control signal and the focus control signal are output from the DSP 20 to the focus/tracking controller 14. The focus/tracking controller 14 uses the tracking control signal to form an actuator driving signal for tracking control, and uses the focus control signal to form an actuator driving signal for focus control, and both signals are supplied to the actuator 11. The actuator 11 is driven by the actuator driving signals and controls tracking or focus by changing a position of the object lens inside the optical system. Tracking and focus are also controlled during recording.

The DSP 20 or microcomputer 30 as a controller, has four functional blocks. A first functional block is a discriminator judging whether an unrecorded recording layer is included in the plural recording layers of the optical disc 1 mounted in the optical disc apparatus. A second functional block is a control element. Operation of the second functional block is described below. For example, if the optical disc 1 has two recording layers (hereinafter, the recording layer of the two that is closer to the object lens is referred to as the first recording layer, and the other recording layer, as the second recording layer), when results of the above judgment indicate that information is not recorded on the second recording layer, the second functional block first causes information to be test-recorded in a test recording area of the second recording layer by changing a recording power level using an initial focus offset value. Next after calculating a first recording power level according to a particular appropriate value for focus offset adjustment (e.g., an optimum value or a value close thereto), the second functional block provides control for a signal for focus offset adjustment to be test-recorded in a test recording area, a test recording count area, an out-of-spec area, or the like included in the second recording layer, at the calculated first recording power level. A third functional block causes the test-recorded focus offset adjusting signal to be read while changing the focus offset value, evaluates recording quality, and calculates and sets a focus offset value for the second recording layer based on the evaluation results. A fourth functional block first causes information to be test-recorded by once again changing the recording power level using the above-set focus offset value. Next after calculating a second recording power level, the fourth functional block provides control for recording to be executed at the calculated second recording power level.

In the control element as the second functional block, the first recording power level according to the particular appropriate value for focus offset adjustment is calculated and set in the manner below. Symmetry of a characteristics curve of, for example, a PI error with respect to a focus offset, is ensured and a recording power level that allows the PI error value to be lowered is calculated and set as an appropriate recording power level for adjusting the focus offset. The control element that operates as the second functional block is adapted to repeat simulated test recording a plurality of times when the signal for focus offset adjustment is test-recorded in the test recording count area. The control element as the third functional block, evaluates signal quality with a PI error value, for example, and calculates and sets the focus offset value that approximately minimizes the PI error value. The minimization in this case assumes that the PI error is inclusive of its minimum value while at the same time meaning a value falling within the range where an effect/operation approximately equal to the minimum value as far as practical is obtained. As with the control element that operates as the second functional block, the control element that operates as the fourth functional block ensures symmetry of a characteristics curve of, for example, a PI error with respect to a focus offset, and calculates and sets, as an appropriate recording power level for adjusting the focus offset, a recording power level that allows the PI error value to be lowered.

For recording on or reproduction from the optical disc 1, the DSP 20 or the microcomputer 30 directly or indirectly controls the write signal generator 12, the laser drive circuit 9, the laser diode 7, the focus/tracking controller 14, the actuator 11, and other sections, conducts focus offset adjustments for focus control, and conducts the recording or reproducing operation with the focus offset that has been set by the adjustments. In other words, before information/data is written onto, for example, the second recording layer (the layer of the two recording layers that is more distant from the object lens), the DSP 20 or microcomputer 30 as a controller first uses the above-mentioned discriminator to judge whether information is already recorded on the second recording layer. Next, if no information is judged to be present on the second recording layer, the controller causes a signal to be test-recorded in a test recording area of the second recording layer by changing the recording power level using an initial focus value. After thus calculating the first recording power level for adjusting the focus offset, the controller causes a signal for focus offset adjustment to be test-recorded in an area such as the test recording area, test recording count area, or out-of-spec area of the second recording layer, at the calculated recording power level. Additionally, the controller reads the test-recorded focus offset adjusting signal while changing its signal level, evaluates the quality of the signal, and calculates and sets the focus offset value of the second recording layer from evaluation results. Next, the controller once again causes a signal to be test-recorded in the test recording area by changing the recording power level using the set focus offset value, then calculates the appropriate second recording power level for the recording operation, and starts the recording operation at the calculated appropriate second recording power level.

FIG. 2 is a diagram that explains the internal construction of the optical disc 1. This diagram assumes that the optical disc 1 has two recording layers.

Reference number 10a in FIG. 2 denotes the object lens located within the optical system 10 of the optical pickup 3, 1a the first recording layer that is the layer closer to the object lens 10a, and 1b the second recording layer that is the layer more distant from the object lens 10a. Reference number 101 denotes a data area for recording information/data, 102 the test recording area, 103 the recording count area, 104 an out-of-spec area (an area outside certain specifications), and 200 a central axis of the disc. Reference number 101a denotes a data area of the first recording layer, 101b a data area of the second recording layer, 102a the test recording area of the first recording layer 1a, 102b the test recording area of the second recording layer 1b, 103a the recording count area of the first recording layer 1a, 103b the recording count area of the second recording layer 1b, 104a the out-of-spec area of the first recording layer 1a, 104b an out-of-spec area of the second recording layer 1b, 102a1 a test-recorded section of the test recording area 102a within the first recording layer 1a, and 102b1 a test-recorded section of the test recording area 102b within the second recording layer 1b. Before information/data is written onto the data area 101b of the second recording layer, the discriminator inside the DSP 20 or microcomputer 30 judges whether information is already recorded on the second recording layer 1b. Next, if information is not recorded on the second recording layer 1b, the controller causes a signal to be test-recorded in the test recording area 102b, recording count area 103b, or out-of-spec area 104b of the second recording layer, as described above. After that, the controller sets the focus offset value of the second recording layer, based on test recording results, and causes a signal to be test-recorded once again using the set focus offset value. Next after calculating the appropriate recording power level, the controller starts the recording operation at the calculated recording power level and with the set focus offset value.

Constituent elements of the optical disc apparatus in FIG. 1 used in the description below are assigned the same reference numbers as those of FIGS. 1, 2.

FIG. 3 is a characteristics illustration showing the relationship between focus offsets and PI errors in the optical disc apparatus of FIG. 1.

The illustration in FIG. 3 shows an example of the PI error characteristics obtained when the signal for focus offset adjustment that was test-recorded in the test recording area 102b (see FIG. 2) of the second recording layer 1b, the test recording count area 103b, the out-of-spec area 104b, or the like, during control by the third control element, is read out by the fourth control element by changing the focus offset value.

When a PI error detection threshold is E1, a PI error equal to or greater than the detection threshold E1 is detected, and a PI error according to a focus offset below a lower-limit value F2, and a PI error according to a focus offset above an upper-limit value F3 are detected, as in the PI error characteristics curve A of FIG. 3. Between the lower-limit value F2 and the upper-limit value F3, PI errors are regarded as equal to the detection threshold E1, and a PI error value equal thereto is regarded as a minimum PI error value. The fourth control element controls to read a signal while changing the focus offset value, and sets, as the focus offset for recording or reproduction, essentially a central focus offset value F1 between the lower-limit value F2 and the upper-limit value F3, the focus offset value F1 being between the lower-limit value F2 that becomes the minimum PI error value, and the upper-limit value F3, as the focus offset for reading or reproduction.

FIG. 4 is an explanatory diagram of the operating procedure for adjusting focus offsets in the second recording layer of the optical disc 1 mounted in the optical disc apparatus of FIG. 1.

In FIG. 4, operation progresses in the following sequence:

(1) The DSP 20 or microcomputer 30 as a controller starts focus offset adjustment (step S401).

(2) The DSP 20 or the microcomputer 30 uses the discriminator to judge whether information is already recorded on the second recording layer (L1 layer) of the optical disc within the apparatus (step S402).

(3) If information is judged not yet to be recorded on the second recording layer as a result of the judgment, the DSP 20 or the microcomputer 30 sets an initial focus offset value for the second recording layer 1b (step 403).

(4) The DSP 20 or the microcomputer 30 changes the recording power level using the above-set initial focus offset value, causes test recording in the test recording area 102b of the second recording layer 1b, and sets the first recording power level for focus offset adjustment (step S404).

(5) The DSP 20 or the microcomputer 30 causes a signal for focus offset adjustment to be test-recorded in, for example, the test recording area 102b, test recording count area 103b, or out-of-spec area 104b of the second recording layer 1b, at the recording power level set in step S404. (Step 405)

(6) The DSP 20 or the microcomputer 30, while changing the focus offset, causes reproduction (reading) of the signal for focus offset adjustment test-recorded in step S405, and conducts a signal quality evaluation such as PI error evaluation of the read signal (step 406). The focus offset value that minimizes an error rate, for example, is calculated during the evaluation.

(7) The DSP 20 or the microcomputer 30 sets the focus offset value of the second recording layer 1b to the above-calculated value (step 407).

(8) The DSP 20 or the microcomputer 30 completes focus offset adjustment of the second recording layer 1b (step 408).

(9) If, as a result of the judgment in step S402, any information (signal) is recorded on the second recording layer, the DSP 20 or the microcomputer 30 reads the recorded information (signal) and conducts a signal quality evaluation such as PI error evaluation of the read signal (step 409). The focus offset value that minimizes an error rate, for example, is calculated during this evaluation as well. The DSP 20 or the microcomputer 30 sets the focus offset value of the second recording layer 1b to the above-calculated value (step 407).

The series of focus offset adjusting operations in above steps (1) to (9) is further followed by the step below:

(10) The DSP 20 or the microcomputer 30 once again changes the recording power level according to the focus offset value set in step S407, causes test recording in the test recording area 102b of the second recording layer 1b, and after calculating the appropriate recording power level for recording, starts the recording operation at the calculated recording power level and with the above-set focus offset value.

The series of focus offset adjusting operations in above steps (1) to (9), and the immediately following operation of causing test recording in step (10), operation of calculating the recording power level for recording, and operation of starting the recording operation are all automatically conducted by the DSP 20 or microcomputer 30 as a controller, by executing the above successive procedural steps in accordance with a program. The present embodiment assumes that the program for causing the DSP 20 or the microcomputer 30 to execute this procedure is prestored within, for example, a memory (not shown) of the optical disc apparatus 1.

According to the embodiment of the present invention, adjustment (inclusive of setup) of appropriate focus offsets is possible, even for the second recording layer 1b under its unrecorded state, and the optical disc apparatus can be consequently improved in operational convenience.

While the above embodiment assumes two recording layers, the present invention is not limited to this layer structure and includes three or more layers. In addition, while the write signal generator 12, the read/error signal processor 13, and the focus/tracking controller 14 are arranged outside the DSP 20 in the above embodiment, the invention is not limited to this arrangement, either, and part or all of these sections may be disposed inside the DSP 20. Furthermore, while, in FIG. 3, only PI errors exceeding a PI error detection threshold are detected and PI errors between the lower-limit value F2 and the upper-limit value F3 are regarded as equal to the detection threshold, the invention is not limited to this PI error detection method, either. Moreover, the apparatus may, of course, be constructed so that both the DSP 20 and microcomputer 30 functioning as a controller conduct the above control operation.

The present invention can be embodied in other specific forms without departing from the spirit or essential characteristics thereof. The invention is therefore not to be considered in all respects as illustrative and not restrictive, the scope of the invention being indicated by the appended claims rather than by the foregoing description, and all changes that come within the meaning and range of equivalency of the claims are therefore intended to be embraced therein.

What is claimed is:

1. An optical disc apparatus that records or reproduces information by irradiating laser light onto an optical disc having a plurality of recording layers, through an object lens, the apparatus comprising:
a write signal generator to generate a write signal for recording information on the optical disc;
a laser diode to generate laser light in accordance with the write signal; and
a controller, when the plurality of the recording layers of the optical disc mounted inside the optical disc apparatus include an unrecorded recording layer, to:
cause a signal to be recorded in a test recording area of the unrecorded recording layer by changing a recording power level using an initial focus offset value;
calculate a level of a recording power for focus offset adjustment in accordance with reproduction result of the signal recorded in the test recording area;
cause a signal for the focus offset adjustment to be recorded into the test recording area with the recording power for focus offset adjustment;
calculate and set a focus offset value for subsequent recording of information based on reproduction of the recorded signal for the focus offset adjustment; and
control the write signal generator to generate the write signal;
wherein the controller generates a variable focus offset value while reproducing a previously recorded signal for focus offset adjustment, then evaluate quality of the signal, and calculate the appropriate focus offset value based on the evaluation results obtained.

2. The optical disc apparatus according to claim 1, wherein the controller causes the signal for focus offset adjustment to be recorded in an information recording area, an area closer to an inner circumferential edge of the optical disc than the information recording area, or an area close to an outer circumferential edge of the optical disc.

3. The optical disc apparatus according to claim 1, wherein the controller causes test recording with the set focus offset value by changing a recording power level, then calculate a recording power level for actually recording information, and causes the information to be actually recorded at the calculated recording power level.

4. The optical disc apparatus according to claim 1, wherein the controller, during the recording of the signal for focus offset adjustment, causes a process of repeating the recording operation a plurality of times to be conducted in a simulated fashion.

5. An optical disc apparatus that records or reproduces information by irradiating laser light onto an optical disc having a plurality of recording layers, through an object lens, the apparatus comprising a controller to:
confirm that an unrecorded recording layer without information recorded thereon is included in the plurality of recording layers of the optical disc mounted inside the apparatus;
cause a test recording operation in a test recording area of the recording layer to be conducted with an initial focus offset value;
calculate from results of the test recording operation a recording power level for focus offset adjustment;
cause a signal for focus offset adjustment to be test-recorded in a required area of the recording layer at the recording power level;
read the signal and evaluate quality thereof;
calculate and set a focus offset value of the recording layer, based on results of the evaluation;

cause another test recording operation to be conducted with the set focus offset value by changing the recording power level;

calculate an appropriate recording power level for actually recording information; and cause the information to be actually recorded at the recording power level.

6. A method of adjusting a focus offset in an optical disc apparatus which records or reproduces information by irradiating laser light onto an optical disc having a plurality of recording layers, through an object lens, wherein, in order to implement the adjustment of the focus offset, the method comprising steps of:

when an unrecorded recording layer without information recorded thereon is included in the plurality of recording layers of the optical disc mounted inside the apparatus, causing a signal to be recorded in a test recording area of the unrecorded recording layer by changing a recording power level using an initial focus offset value;

calculating a level of a recording power for focus offset adjustment in accordance with reproduction result of the signal recorded in the test recording area;

causing a signal for focus offset adjustment to be recorded into the test recording area with the recording power for focus offset adjustment;

generating a variable focus offset value while reproducing a previously recorded signal for focus offset adjustment, then evaluating a quality of the signal; and calculating and setting a focus offset value for subsequent recording information based on reproduction of the recorded signal for the focus offset adjustment.

7. The method of adjusting a focus offset in an optical disc apparatus according to claim 6, wherein, in the step of calculating the level of a recording power for focus offset adjustment, the signal for adjusting the focus offset is test-recorded in the test recording area of the unrecorded recording layer or in an area other than the area defined by standards.

8. The method of adjusting a focus offset in an optical disc apparatus according to claim 6, wherein, in the step of calculating the level of a recording power for focus offset adjustment, the signal for adjusting the focus offset is test-recorded in a test recording count area of the unrecorded recording layer and a test recording process is repeated a plurality of times in a simulated fashion during the test recording of the signal.

* * * * *